(12) United States Patent
Ning et al.

(10) Patent No.: US 10,437,021 B1
(45) Date of Patent: Oct. 8, 2019

(54) HIGH PERFORMANCE LENSES

(71) Applicants: Alex Ning, Carlsbad, CA (US); Ting Heng Hsieh, Carlsbad, CA (US)

(72) Inventors: Alex Ning, Carlsbad, CA (US); Ting Heng Hsieh, Carlsbad, CA (US)

(*) Notice: Subject to any disclaimer, the term of this patent is extended or adjusted under 35 U.S.C. 154(b) by 0 days.

(21) Appl. No.: 15/716,420

(22) Filed: Sep. 26, 2017

Related U.S. Application Data

(60) Provisional application No. 62/551,078, filed on Aug. 28, 2017, provisional application No. 62/400,952, filed on Sep. 28, 2016.

(51) Int. Cl.
*G02B 9/34* (2006.01)
*G02B 13/00* (2006.01)
*G02B 9/64* (2006.01)
*G02B 9/62* (2006.01)

(52) U.S. Cl.
CPC ............. *G02B 13/005* (2013.01); *G02B 9/62* (2013.01); *G02B 9/64* (2013.01)

(58) Field of Classification Search
CPC ....... G02B 13/0045; G02B 13/04; G02B 9/34
USPC .......................... 359/715, 753, 771, 781, 783
See application file for complete search history.

(56) References Cited

U.S. PATENT DOCUMENTS

| | | |
|---|---|---|
| 4,329,024 A | 5/1982 | Rogers |
| 7,023,628 B1 | 4/2006 | Ning |
| 7,929,221 B2 | 4/2011 | Ning |
| 7,940,478 B2 | 5/2011 | Take |
| 8,503,110 B2 | 8/2013 | Oshita |
| 8,659,841 B2 | 2/2014 | Enomoto |
| 8,964,312 B2 | 2/2015 | Kawamura |
| 2001/0024332 A1* | 9/2001 | Mori ............... G02B 13/04 359/755 |
| 2011/0115963 A1 | 5/2011 | Sueyoshi |
| 2011/0299179 A1* | 12/2011 | Maetaki ............ G02B 7/08 359/754 |
| 2015/0205080 A1 | 7/2015 | Yokoyama |
| 2016/0202452 A1* | 7/2016 | Kuo ................ G02B 13/04 359/708 |

* cited by examiner

*Primary Examiner* — William Choi
(74) *Attorney, Agent, or Firm* — Mark Wisnosky

(57) ABSTRACT

High performance lens system designs are described. The lens system has four lens groups, is made entirely of spherical lens elements, and, includes selected lens elements made of materials with high refractive index and Abbe numbers and coefficient of thermal expansion that provide stable high performance across wide and rapid temperature changes. Group descriptions and parametric equations enable creation of designs having fields of view ranging from 50 to 150 degrees.

8 Claims, 12 Drawing Sheets

HIGH PERFORMANCE LENSES

CROSS-REFERENCE TO RELATED APPLICATIONS

This application claims priority to U.S. Provisional Application 62/551,078, titled Wide-angle high performance lenses, filed Aug. 28, 2017, and, U.S. Provisional Application 62/400,952, titled high performance lenses, filed Sep. 28, 2016, both including a common inventor.

STATEMENT REGARDING FEDERALLY SPONSORED RESEARCH OR DEVELOPMENT

Not Applicable.

BACKGROUND OF THE INVENTION

Technical Field

The invention relates to wide-angle lenses, having high quality images across the entire field of view in a compact form factor.

Related Background Art

Digital imaging cameras use solid-state image sensors such as CCD or CMOS imagers to convert optical images into electronic signals. As the resolution of the imagers increases, there is a continuous need for optical lenses with increased performance. An important characteristic of the lens is the ability to produce high-resolution images across a wide field of view. Another important characteristic is to produce such high-resolution images using a lens that is of a compact size. The lenses are increasing being incorporated into a variety of electronic devices including mobile phones, cameras, sports cameras, computers and computer peripherals. Incorporation of the lenses into new devices also places new environmental performance requirements upon the lens. The lens must be compact and light, to be used in portable devices, and must maintain high performance characteristics.

The quality and pixel density of very small imaging sensors is continuously improving. The sensors are used in machine vision, medical, cell phone and automotive applications. In many cases low distortion is critical to proper functioning in the intended application. These lenses are being used more and more in consumer application where literally millions of such lens systems must be easily produced at consistent high quality and at low cost. Custom lens features required to produce low distortion must be designed such that they are also easy to manufacture. The lenses also are now subject to more extremes in environment. A lens that exhibits low distortion and performs consistently across a wide and rapidly changing temperature range is required.

Frequently aspheric elements have been used for improved lens performance. However, if the aspheric lenses are made from plastic the higher temperature variation of plastic precludes their use in a varying environment. Aspheric lens can be made of glass as well, but that adds greatly to the difficulty to manufacture and cost of a lens and may preclude their use in high volume cost sensitive applications.

Distortion cannot be fully corrected through mathematical manipulation of the digital images, in order for such corrections to be effective requires that the lens manufacturer produces a well behaved lens.

There is a need for new lens designs that exhibit low color aberration and optical distortion that follows the f-tan relationship, the lens is a compact lens and maintains optical performance over a wide range of, and rapidly changing, temperatures.

There is a need for new lens designs that exhibit low color aberration and low optical distortion that are constructed of glass and avoid the use of aspheric lens elements.

There is a need for a lens design that can cover the range from medium to wide angle field of view.

There is also need to provide medium and wide-angle lens designs that can be manufactured inexpensively, consistently and can be automatically assembled.

BRIEF SUMMARY OF THE INVENTION

The objective of this invention is to provide high performance imaging lenses with low F-numbers having narrow and wide angle of view. High performance imaging lenses are characterized by low f-number (<2), high resolution, wide spectral range, low chief ray angle, and stability with respect to a change in environmental conditions such as temperature. They also a need to achieve various field of views from narrow (about 50 degrees) to wide (about 150 degrees). To achieve the stated objective, the present invention includes optical materials in selected lens elements with low Abbe numbers exceed 63, or/and a negative dn/dT value, where n is the index of refraction of the material at d-line, and T is a temperature of an environment containing the optical lens. There are four groups from the object side to the image side (left to right):

1) Group 1 has negative power and consists of one or two elements. All elements in group 1 have negative power.
2) Group 2 has positive power comprising 1 to 3 elements.
3) Group 3 comprises at least a cemented doublet or a cemented triplet, where the positive element of the doublet or at least one of the positive elements of the triplet is made of a low dispersion material having an Abbe number greater than 63. In preferred embodiments, at least one of the positive elements of the doublet or triplet is made of an optical material having a negative dn/dT over the operating temperature range, typically −40 to +85° C., where n is the index of refraction of the material at d-line, and T is the temperature of the environment. In preferred embodiments, group 3 includes two cemented doublets with the aperture stop between them. In one embodiment, an optional meniscus lens element is positioned adjacent to the doublet or the triplet. An aperture stop is adjacent to or embedded in this group. In preferred embodiment the aperture stop is on the object side of the cemented triplet or embedded within a pair of doublets.
4) Group 4 has positive power comprising 1 to 3 elements Optical filters and cover glasses for the image sensor are optionally added after the fourth lens group.

The lenses satisfy the following parametric equations:

$$-2 =< F1/F =< -0.8 \tag{1}$$

$$1.5 =< F2/F =< 3.5 \tag{2}$$

$$2. =< |F3/F| \tag{3}$$

$$1. =< F4/F =< 3.5 \tag{4}$$

$$-3 =< F4/F1 =< -0.6 \tag{5}$$

$$0.3 =< F4/F2 =< 2.5 \tag{6}$$

Where F is the focal length of the entire lens assembly and Fi is the focal length of lens group i.

In preferred embodiments the following equation is satisfied by Group 1:

$$-1.6 =< F1/F =< -0.8 \qquad (7)$$

The examples fall into two general categories: wide angle lenses with a field of view greater than 100 degrees and narrow angle lenses with a field of view of about 50 degrees. Both categories satisfy the descriptions and parametric equations discussed above.

The specific examples are not intended to limit the inventive concept to the example application. Other aspects and advantages of the invention will be apparent from the accompanying drawings and detailed description.

DETAILED DESCRIPTION OF THE INVENTION

The description of the lens elements as flat, convex or concave refers to the curvature at this point on the lens surface that intersects the optical axis. The term lens refers to the lens system that is comprised of a plurality of lens elements. Each lens element by itself is also known in the literature as a lens. Here, lens system may refer to the multi-component system or an individual lens element within the lens system. In all cases the meaning will be clear from context and form reference numbers.

Figure 1:
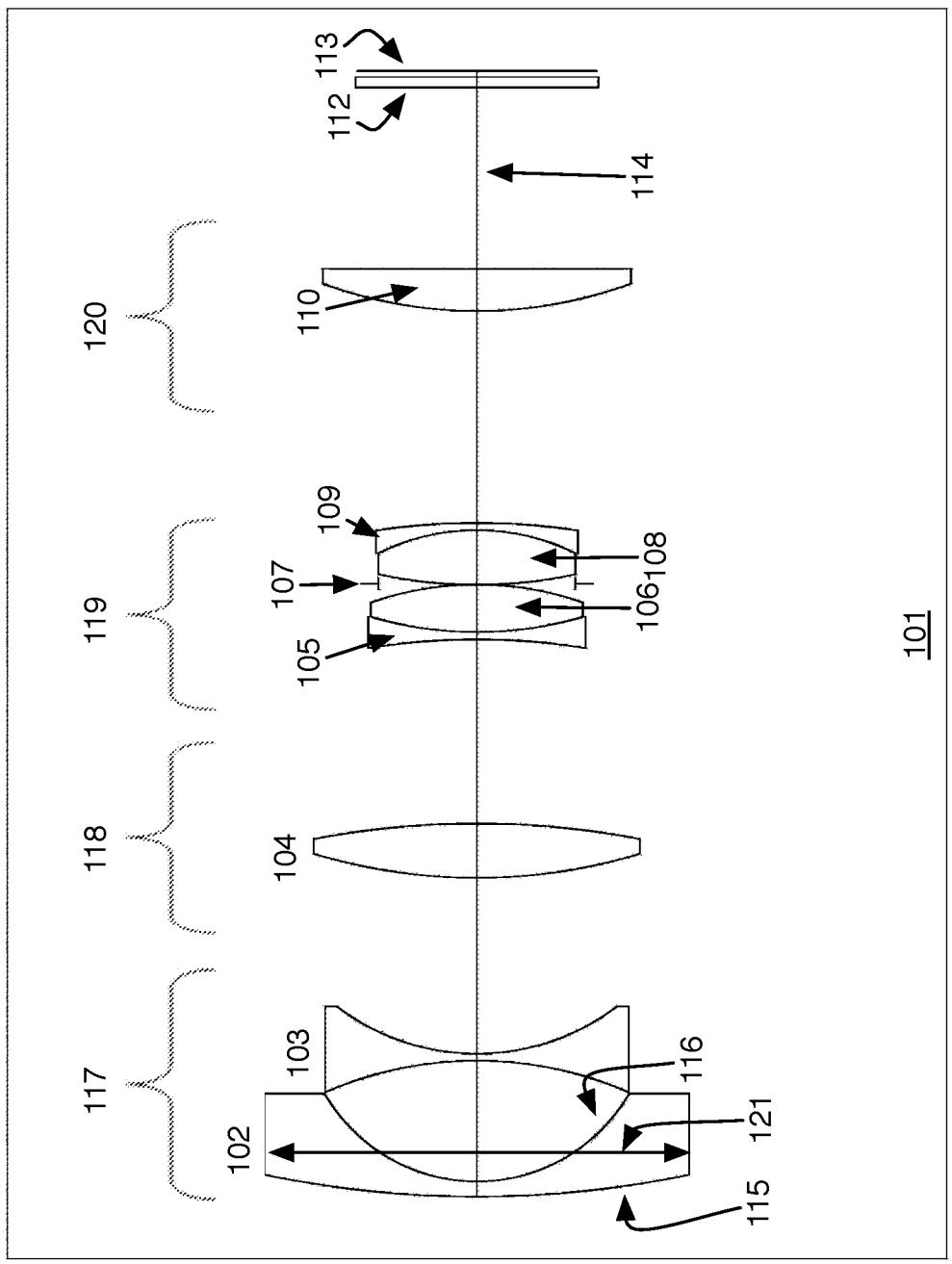
FIG. 1 is a diagram of a first embodiment of the high performance lens.

Referring to FIG. 1 an invented lens system 101 is shown. The lens system 101 is shown in a cross-sectional profile, as are all of the subsequent lens system designs. The lens system 101 is centered on the optical axis 114. The lens system is oriented such that the object side is to the left and the image side is to the right. The lens or lens system 101 is comprised of a plurality of lens elements 102-106 and 108-110 and includes an aperture stop 107. The image plane 113 is at the right edge of the lens system. It is the location of an optical imaging device such as a CCD or CMOS imagers to convert optical images into electronic signals as are known in the art. The particular example of FIG. 1 includes, from object to image, four lens groups 117-120. There are four groups from the object side to the image side (left to right):

1) Group 1 has negative power comprising two elements 102, 103.

2) Group 2 has positive power comprising 1 to 3 elements, in this case a single lens element 104.

3) Group 3 comprises at least cemented doublet or cemented triplet, where the positive element of the doublet is made of Iowa low material having Abbe number greater or equal to 63. In preferred embodiments, group 3 includes two cemented doublets with the aperture stop between them. In this specific example, two cemented doublets are included 105, 106 and 108, 109 low. The first positive element 106 has an index of refraction of 1.59 and an Abbe number of 68.6 a d the second positive element has an index of refraction of 1.46 and an Abbe number of 90.2. In a preferred embodiment, at least one of the positive elements 106, 108 of the doublet or triplet is made of an optical material having a negative do/dT over the operating temperature range, where n is the index of refraction of the material at d-line, and T is the temperature of the environment. Such materials may include FCD505 and FCD10A glasses made by Hoya Optical glasses. An aperture stop 107 is embedded in this group. In preferred embodiment the aperture stop is on the object side of the triplet or embedded within a pair of doublets. In this case the aperture stop is embedded in the pair of cemented doublets.

4) Group 4 has positive power comprising 1 to 3 elements, in this case a single lens element 110 comprises group 4.

Further details of this first example include, the first lens group 117 is comprised of two lens elements 102, 103. The first lens element 102 has a convex object surface 115 and a concave image surface 116. The second lens element 103 is, in this example, a biconcave lens element. The second lens group 118 is comprised of a single lens element 104. The third lens group 119 is comprised of two cemented doublets 105, 106 and 108, 109. There is an aperture stop 107 located between the cemented doublets. The fourth lens group 120 is comprised of a single lens element 110. All of the lens elements are situated symmetrically along the optical axis 114 of the lens system 101. An optional cover glass 112 for the imaging device located at the image plane 113 is also included. The lens system of FIG. 1 satisfies the general description discussed above of a lens system with four lens groups and satisfies all of the parametric equations 1-6. The detailed parameters for each of the lens elements of this first example are shown in Table 1. Similarly details for each of the subsequent included in FIGS. 2-12 are presented in the same format in subsequent tables 2-12 respectively. Each of the lens examples include a specification for each lens element. The specification includes material properties such as index of refraction and Abbe number as well as surface curvature, thickness of the lens elements and spacing between lens elements The radius of curvature for each lens element is measured at the intersection of each surface with the optical axis 114. Surfaces are numbered consecutively from object to image. Thus surface 1 is the first surface 115 of the first lens element 102. Surface 2 is the second or image side surface 116 of the same lens element. Surface 3 is the first, object side, surface (not labeled) of the second lens element 103 and so forth through all elements of the lens system 101. Thickness is defined as the distance from the surface to the next labeled surface measured along the optical axis 114. For example, in the Table 1 the thickness of the first lens element 102, the distance between the first surface 115 and the second surface 116 of that lens element, and is 1.00 mm. The distance from the image side surface 116 to object side surface of the second lens element is 8.06 mm. Nd in Table 1 is the index of refraction, and, Abbe # is the Abbe Number for the lens element corresponding to the designated surface at 578 nm (d-line). For example, the index of refraction of the first lens element 102 is 1.44 and the Abbe Number of the first element 102 is 95.10. The values for Radius and Thickness values are all given in mm. The values may be scaled by the effective focal length and the design may therefore be scaled for a lens of any focal length. The table of parameters for all subsequent examples uses the same format as shown in table 1.

Specific examples satisfying the description of the invented high performance lenses follow. Each of the examples represent a wide angle lens with a field of view of between 50 and 140 degrees, are comprised of four lens groups as described above, satisfy equation 1-6, include no aspherical elements or plastic lens elements, and, include at least one lens element with a high Abbe number.

Examples 1-6 show lens systems that satisfy the design parameters including the description of the four lens groups and the parametric equations 1-6 and have a field of view between 97 and 145 degrees.

Examples 7-12 show lens systems that satisfy the design parameters including the description of the four lens groups and the parametric equations 1-6 and have a field of view of 51 degrees.

The particular designs are provided as examples. Designs satisfying the description including the parametric equations can be made with any lens angle between 50 and 150 degrees.

Example 1

FIG. 1 shows the layout of Example 1. The design is, as already discussed above, comprised of, from object to image, of four lens groups. The first lens group 117 has two negative lens elements 102, 103, the second lens group 118 is comprised of a single positive lens element 104. The third lens group 119 is comprised of a pair of cemented doublets. The first includes lens elements 105, 106 and the second includes the two lens elements 108, 109. An aperture stop 107 is situated between the two cemented doublets of the third lens group. At least one positive element of the cemented doublets of the third lens group is made of materials having a high abbe number and has a negative coefficient for the change of refractive index (D-line) versus temperature. In this case positive lens element 108 is made from material having a high Abbe number (90.2) and a negative do/dT. The fourth lens group 120 includes a single positive lens element 110. This design has a field of view of 94°, with a relative aperture of F/1.8. Table 1 shows the optical specification for this first example. The surfaces are numbered as already described. The radiuses of curvature are measured at the optical axis 114. The column Lens Element refers to the numbered lens elements of FIG. 1. The conic constant for all surfaces in this example and all others is 0. The surfaces in all of the examples are spherical surfaces. The EFL of this example 1 is 10.2 mm. The conditional expressions (1) through (6) are satisfied.

TABLE 1

The optical prescription of Example 1.

| Surface | Radius | Thickness | Nd | Abbe# | Lens Element |
|---|---|---|---|---|---|
| 1 | 69.14 | 1.01 | 1.44 | 95.10 | 102 |
| 2 | 11.69 | 8.06 | | | |
| 3 | −25.16 | 0.46 | 1.44 | 95.10 | 103 |
| 4 | 15.36 | 11.73 | | | |
| 5 | 37.44 | 3.63 | 1.95 | 32.32 | 104 |
| 6 | −57.14 | 12.27 | | | |
| 7 | −45.75 | 0.50 | 1.67 | 32.17 | 105 |
| 8 | 25.01 | 3.17 | 1.59 | 68.62 | 106 |
| 9 | −21.20 | 0.06 | | | |
| STO | Infinity | −0.08 | | | |
| 11 | 31.12 | 3.65 | 1.46 | 90.19 | 108 |
| 12 | −14.68 | 0.48 | 1.85 | 23.78 | 109 |
| 13 | −45.39 | 14.14 | | | |
| 14 | 29.73 | 2.80 | 2.00 | 29.13 | 110 |
| 15 | 2031.60 | 12.11 | | | |
| 16 | Infinity | 0.70 | 1.52 | 64.21 | |
| 17 | Infinity | 0.40 | | | |
| IMA | Infinity | | | | |

Example 2

Figure 2:
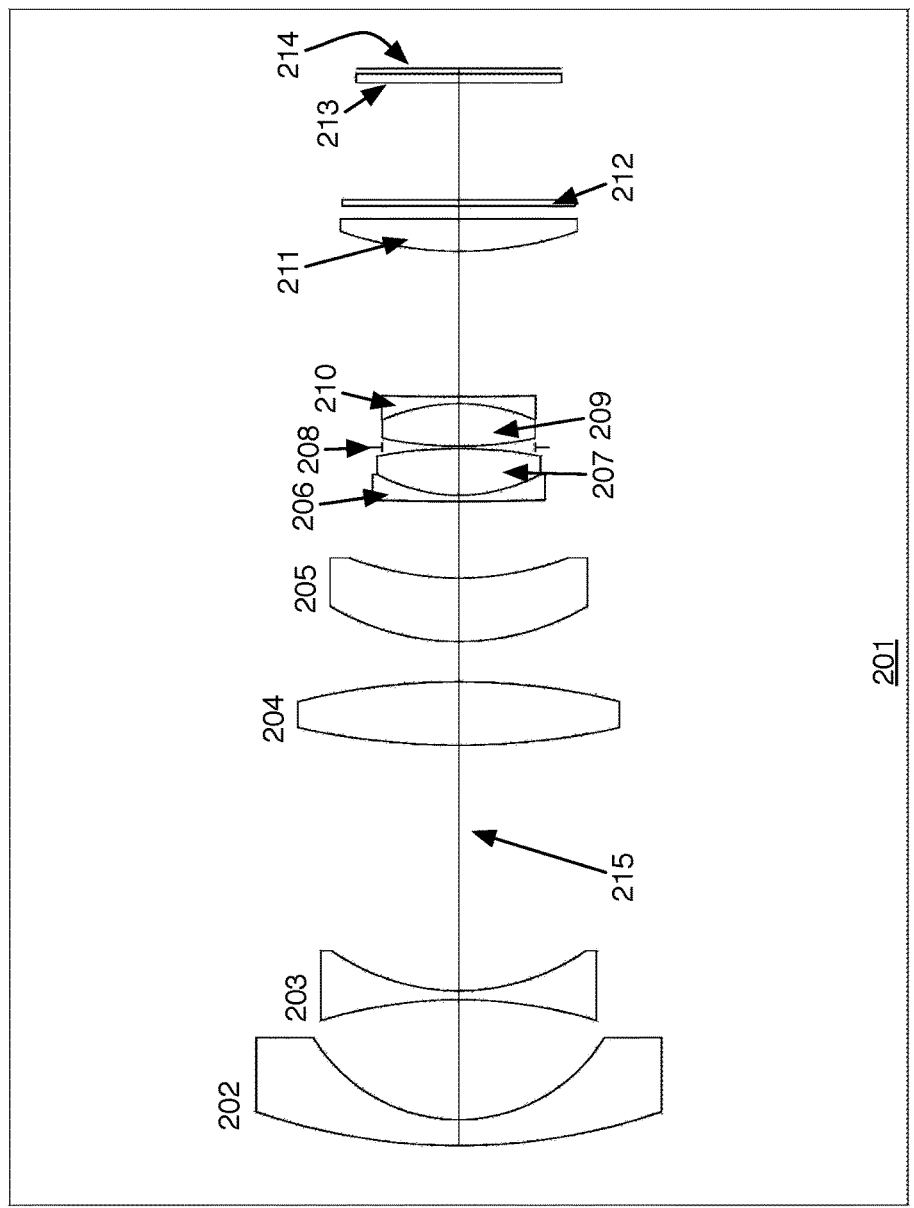
FIG. 2 is a diagram of a second embodiment of the high performance lens.

FIG. 2 shows the layout of Example 2. This design has a field of view of 97° with a relative aperture of F/1.8.

There are four groups in lens system 201 of Example 2 comprising, from the object side to the image side (left to right):

1) Group 1 has negative power and consists of two negative power elements 202, 203.
2) Group 2 has positive power comprising 1 to 3 elements, in this example Group 2 is comprised of two lens elements 204, 205.
3) In this particular example Group 3 is comprised of a pair of cemented doublets 206, 207 and 209, 210 with an aperture stop 208 embedded between the doublets. There is no optional meniscus element in this example. The positive elements 207, 209 of the cemented doublets are made from a material having low dispersion properties in that the index of refraction and Abbe number of the first positive element 207 are 1.59 and 68.6 respectively and the index of refraction and Abbe number of the positive element 209 of the second doublet are also 1.59 and 68.6 respectively. Both positive lens elements 207, 209 have a negative value for do/dT.
4) Group 4 has positive power comprising 1 to 3 elements. In this case group 4 is comprised of a single element 211.

The lens elements are all arranged symmetrically about the optical axis 215. The design further includes an optional optical filter 212 and a cover 213 covering an image sensor located at the focal plane 214. Optical filters and cover glasses for the image sensor are optionally added after the fourth lens group.

The lens system satisfies equations 1-6.

The specific lens parameters for Example 2 are included in Table 2 using the same form as already described for Table 1.

TABLE 2

The optical prescription of Example 2.

| Surface | Radius | Thickness | Nd | Abbe# | Lens Element |
|---|---|---|---|---|---|
| 1 | 49.32 | 2.04 | 1.55 | 75.50 | 202 |
| 2 | 13.41 | 9.45 | | | |
| 3 | −36.86 | 0.72 | 1.52 | 64.21 | 203 |
| 4 | 17.53 | 19.41 | | | |
| 5 | 58.43 | 5.01 | 1.95 | 32.32 | 204 |
| 6 | −52.14 | 3.22 | | | |
| 7 | 19.93 | 5.01 | 1.78 | 25.72 | 205 |
| 8 | 24.39 | 6.05 | | | |
| 9 | 226.55 | 0.49 | 1.85 | 23.79 | 206 |
| 10 | 13.46 | 3.67 | 1.59 | 68.62 | 207 |
| 11 | −34.34 | 0.09 | | | |
| STO | Infinity | 0.10 | | | |
| 13 | 29.13 | 3.34 | 1.59 | 68.62 | 209 |
| 14 | −14.90 | 0.56 | 1.85 | 23.79 | 210 |
| 15 | 206.55 | 11.53 | | | |
| 16 | 28.73 | 2.55 | 1.95 | 17.94 | 211 |
| 17 | Infinity | 1.00 | | | |
| 18 | Infinity | 0.50 | 1.52 | 64.21 | |
| 19 | Infinity | 9.24 | | | |
| 20 | Infinity | 0.70 | 1.52 | 64.21 | |
| 21 | Infinity | 0.40 | | | |
| IMA | Infinity | | | | |

TABLE 3

The optical prescription of Example 3.

| Surface | Radius | Thickness | Nd | Abbe# | Lens Element |
|---|---|---|---|---|---|
| 1 | 66.41 | 0.99 | 1.55 | 75.50 | 302 |
| 2 | 11.76 | 8.32 | | | |
| 3 | −19.49 | 0.73 | 1.52 | 64.21 | 303 |
| 4 | 21.66 | 10.77 | | | |
| 5 | 146.95 | 5.02 | 1.95 | 32.32 | 304 |
| 6 | −30.98 | 1.58 | | | |
| 7 | 22.66 | 2.36 | 1.78 | 25.72 | 305 |
| 8 | 43.14 | 8.83 | | | |
| 9 | 46.23 | 0.49 | 1.85 | 23.79 | 306 |
| 10 | 14.84 | 3.83 | 1.55 | 75.50 | 307 |
| 11 | −28.74 | 0.10 | | | |
| STO | Infinity | 0.09 | | | |
| 13 | 22.67 | 3.31 | 1.59 | 68.62 | 309 |
| 14 | −14.99 | 3.72 | 1.85 | 23.79 | 310 |
| 15 | 22.03 | 8.92 | | | |
| 16 | 35.64 | 2.01 | 1.62 | 63.41 | 311 |
| 17 | 137.86 | 0.07 | | | |
| 18 | 32.06 | 3.11 | 1.95 | 17.94 | 312 |
| 19 | −126.74 | 1.00 | | | |
| 20 | Infinity | 0.50 | 1.52 | 64.21 | |
| 21 | Infinity | 8.23 | | | |
| 22 | Infinity | 0.70 | 1.52 | 64.21 | |
| 23 | Infinity | 0.40 | | | |
| IMA | Infinity | | | | |

Example 3

Figure 3:
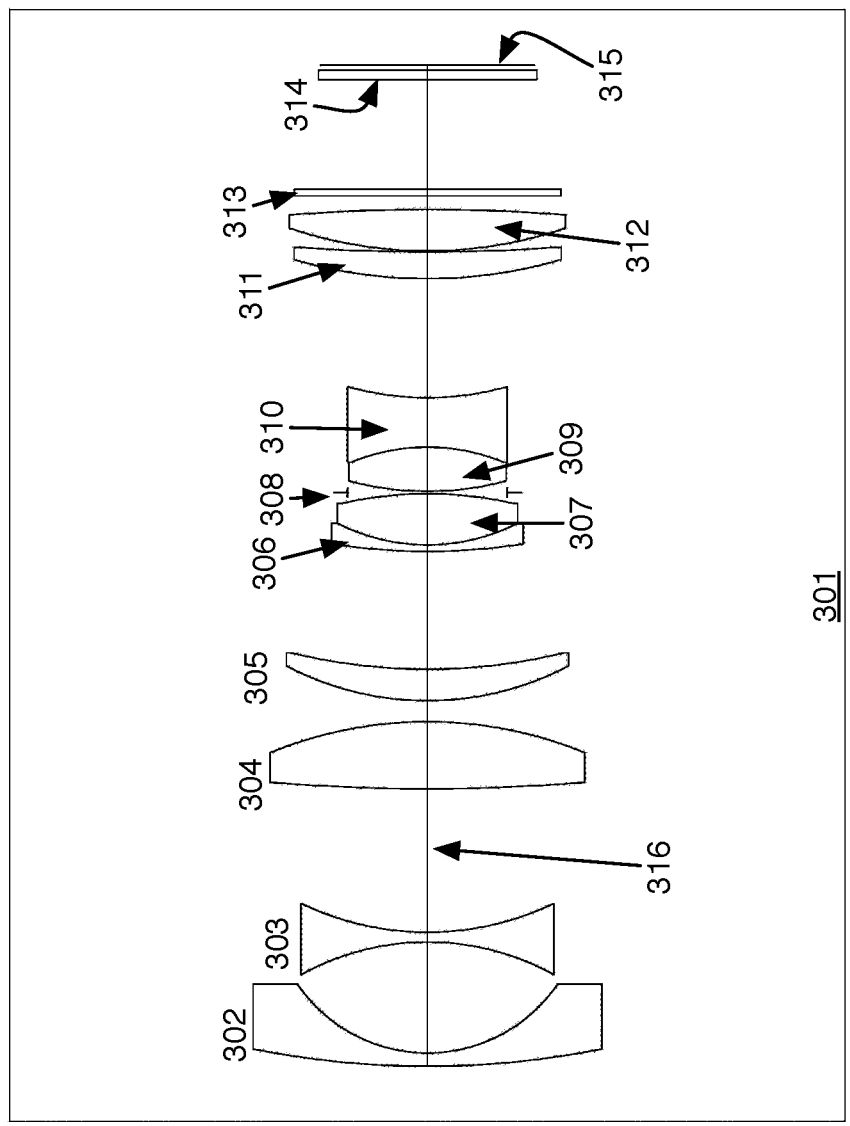
FIG. 3 is a diagram of a third embodiment of the high performance lens.

FIG. 3 shows the layout of Example 3. This design has a field of view of 97.5° with a relative aperture of F/1.8.

There are four groups in lens system 301 of Example 3 comprising, along the optical axis 316, from the object side to the image side (left to right):

1) Group 1 has negative power consisting of two negative power elements 302, 303.

2) Group 2 has positive power comprising 1 to 3 elements, in this example Group 2 is comprised of two lens elements 304, 305.

3) In this particular example Group 3 is comprised of a pair of cemented doublets 306, 307 and 309, 310 with an aperture stop 308 embedded between the doublets. There is no optional meniscus element in this example. The positive elements 307, 309 of the cemented doublets are made from a material having low dispersion properties in that the index of refraction and Abbe number of the first positive element 307 are 1.55 and 75.5 respectively and the index of refraction and Abbe number of the positive element 309 of the second doublet are 1.59 and 68.6 respectively. Both positive elements 307, 309 have a negative value for do/dT.

4) Group 4 has positive power comprising 1 to 3 elements. In this case group 4 is comprised of a two elements 311, 312.

The lens elements are all arranged symmetrically about the optical axis 316. The design further includes an optional optical filter 313 and a cover 314 covering an image sensor located at the focal plane 315.

The lens system satisfies equations 1-6.

The specific lens parameters for Example 3 are included in Table 3 using the same form as already described for Table 1.

Example 4

Figure 4:
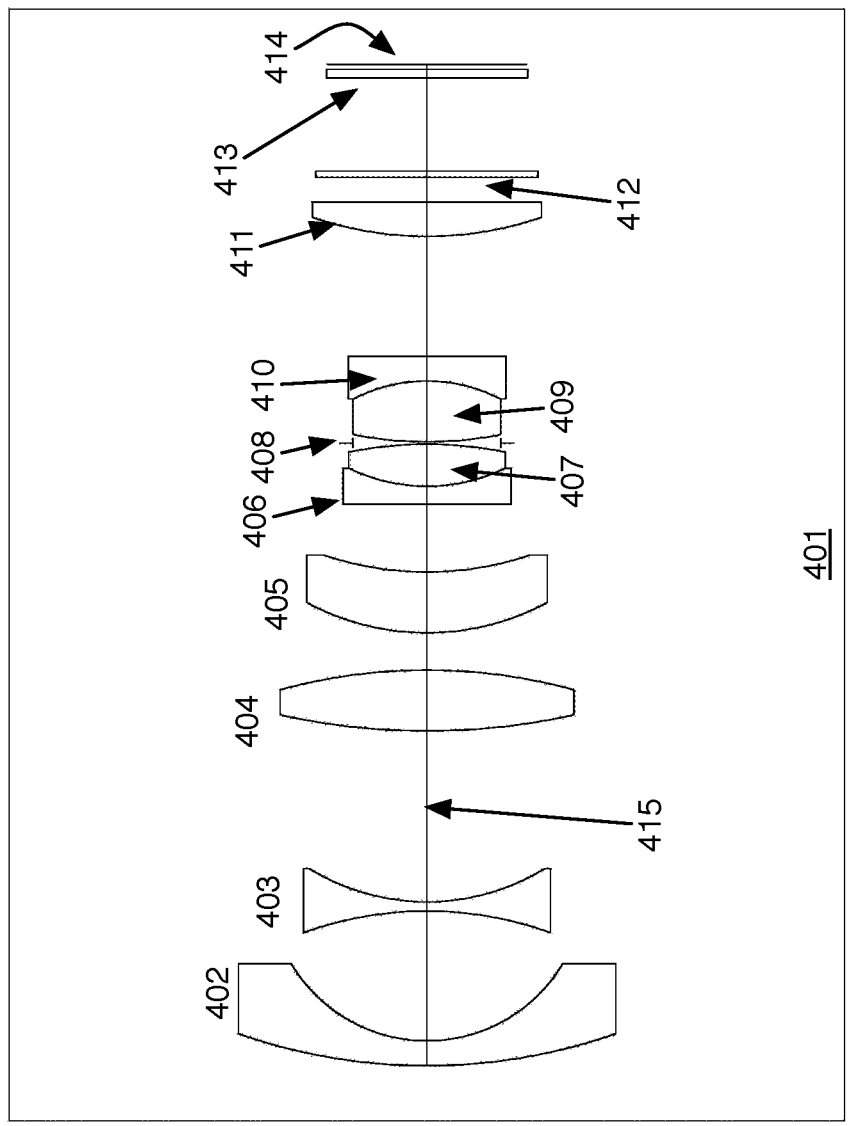
FIG. 4 is a diagram of a fourth embodiment of the high performance lens.

FIG. 4 shows the layout of Example 4. This design has a field of view of 97.6° with a relative aperture of F/1.8.

There are four groups in lens system 401 of Example 4 comprising, along the optical axis 415, from the object side to the image side (left to right):

1) Group 1 has negative power consisting of two negative power elements 402, 403.

2) Group 2 has positive power comprising 1 to 3 elements; in this example Group 2 is comprised of two lens elements 404, 405.

3) In this particular example Group 3 is comprised of a pair of cemented doublets 406, 407 and 409, 410 with an aperture stop 408 embedded between the doublets. There is no optional meniscus element in this example. The positive elements 407, 409 of the cemented doublets are made from a material having low dispersion properties in that the index of refraction and Abbe number of the first positive element 407 are 1.62 and 63.4, respectively, and, the index of refraction and Abbe number of the positive element 409 of the second doublet are 1.62 and 63.4, respectively. Both positive lens elements 407, 409 have a negative value for do/dT.

4) Group 4 has positive power comprising 1 to 3 elements. In this case group 4 is comprised of one element 411.

The lens elements are all arranged symmetrically about the optical axis 415. The design further includes an optional optical filter 412 and a cover 413 covering an image sensor located at the focal plane 414.

The lens system satisfies equations 1-6.

The specific lens parameters for Example 4 are included in Table 4 using the same form as already described for Table 1.

TABLE 4

The optical prescription of Example 4.

| Surface | Radius | Thickness | Nd | Abbe# | Lens Element |
|---|---|---|---|---|---|
| 1 | 45.91 | 2.00 | 1.62 | 63.41 | 402 |
| 2 | 12.68 | 10.45 | | | |
| 3 | −29.15 | 0.75 | 1.52 | 64.21 | 403 |
| 4 | 18.04 | 13.76 | | | |
| 5 | 54.61 | 4.90 | 1.95 | 32.32 | 404 |
| 6 | −44.66 | 3.00 | | | |
| 7 | 20.39 | 4.90 | 1.78 | 25.72 | 405 |
| 8 | 25.96 | 5.45 | | | |
| 9 | Infinity | 1.45 | 1.85 | 23.79 | 406 |
| 10 | 14.27 | 3.38 | 1.62 | 63.41 | 407 |
| 11 | −31.55 | 0.10 | | | |
| STO | Infinity | 0.10 | | | |
| 13 | 30.69 | 4.90 | 1.62 | 63.41 | 409 |
| 14 | −12.71 | 2.00 | 1.85 | 23.79 | 410 |
| 15 | Infinity | 9.65 | | | |
| 16 | 28.38 | 2.75 | 1.95 | 17.94 | 411 |
| 17 | Infinity | 2.00 | | | |
| 18 | Infinity | 0.50 | 1.52 | 64.21 | |
| 19 | Infinity | 7.50 | | | |
| 20 | Infinity | 0.70 | 1.52 | 64.21 | |
| 21 | Infinity | 0.40 | | | |
| IMA | Infinity | | | | |

Example 5

Figure 5:
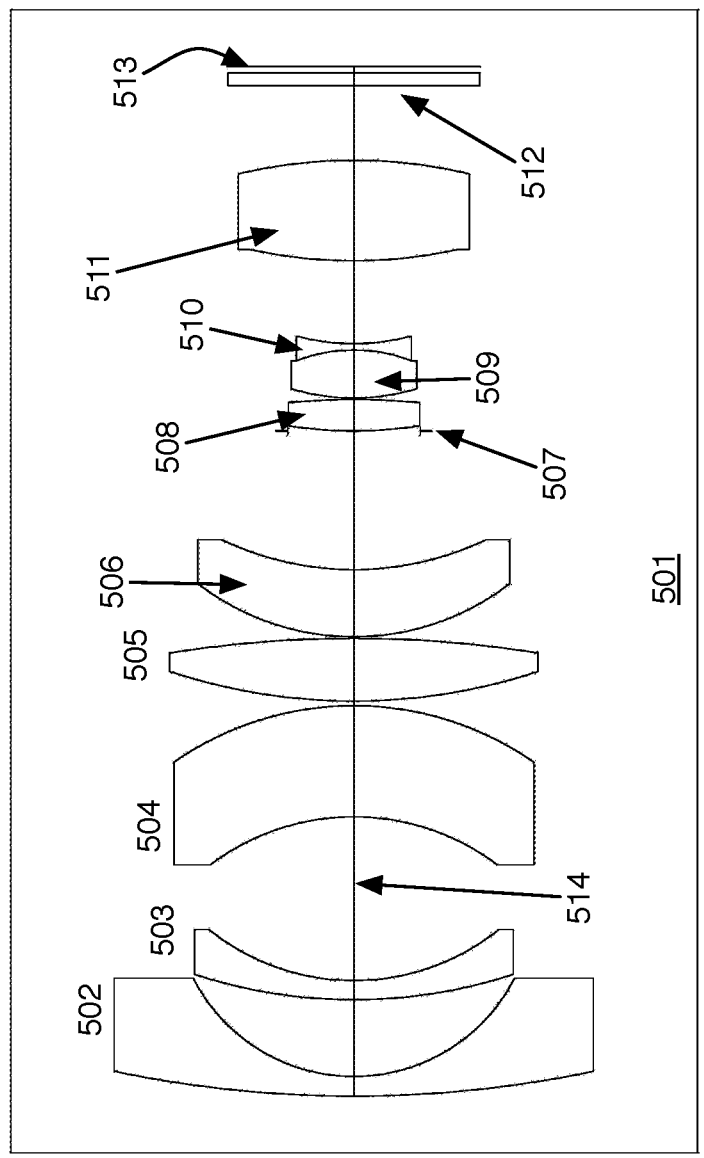
FIG. 5 is a diagram of a fifth embodiment of the high performance lens.

FIG. 5 shows the layout of Example 5. This design has a field of view of 145° with a relative aperture of F/2.

There are four groups in lens system 501 of Example 5 comprising, along the optical axis 514, from the object side to the image side (left to right):
 1) Group 1 has negative power and consists of two negative power lens elements 502, 503.
 2) Group 2 has positive power comprising 1 to 3 elements; in this example Group 2 is comprised of three lens elements 504, 505, 506.
 3) In this particular example Group 3 is comprised of a cemented doublet 509, 510 and positive lens element 508. An aperture stop 507 is adjacent to lens group 3. There is no optional meniscus element in this example. The positive element 509 of the cemented doublet is made from a material having low dispersion properties in that the index of refraction and Abbe number of the positive element 509 of the doublet are 1.62 and 63.4, respectively. The value of do/dT for the positive element 509 is negative.
 4) Group 4 has positive power comprising 1 to 3 elements. In this case group 4 is comprised of one positive lens element 511.

The lens elements are all arranged symmetrically about the optical axis 514. The design a cover 512 covering an image sensor located at the focal plane 513.

The lens system satisfies equations 1-6.

The specific lens parameters for Example 5 are included in Table 5 using the same form as already described for Table 1.

TABLE 5

The optical prescription of Example 5.

| Surface | Radius | Thickness | Nd | Abbe# | Lens Element |
|---|---|---|---|---|---|
| 1 | 74.06 | 1.24 | 1.83 | 37.23 | 502 |
| 2 | 11.39 | 4.85 | | | |

TABLE 5-continued

The optical prescription of Example 5.

| Surface | Radius | Thickness | Nd | Abbe# | Lens Element |
|---|---|---|---|---|---|
| 3 | 32.33 | 1.21 | 1.74 | 49.24 | 503 |
| 4 | 14.59 | 10.35 | | | |
| 5 | −15.04 | 7.02 | 2.00 | 25.44 | 504 |
| 6 | −19.87 | 0.30 | | | |
| 7 | 37.09 | 3.96 | 1.80 | 46.57 | 505 |
| 8 | −73.04 | 0.10 | | | |
| 9 | 16.11 | 4.25 | 1.74 | 44.90 | 506 |
| 10 | 19.39 | 8.76 | | | |
| STO | Infinity | 0.00 | | | |
| 12 | 26.33 | 1.98 | 1.59 | 68.62 | 508 |
| 13 | −46.69 | 0.10 | | | |
| 14 | 13.77 | 3.03 | 1.62 | 63.41 | 509 |
| 15 | −9.91 | 0.40 | 1.85 | 23.79 | 510 |
| 16 | 13.81 | 5.24 | | | |
| 17 | 30.24 | 6.34 | 1.81 | 33.29 | 511 |
| 18 | −31.51 | 4.72 | | | |
| 19 | Infinity | 0.80 | 1.52 | 64.21 | |
| 20 | Infinity | 0.40 | | | |
| IMA | Infinity | | | | |

Example 6

Figure 6:
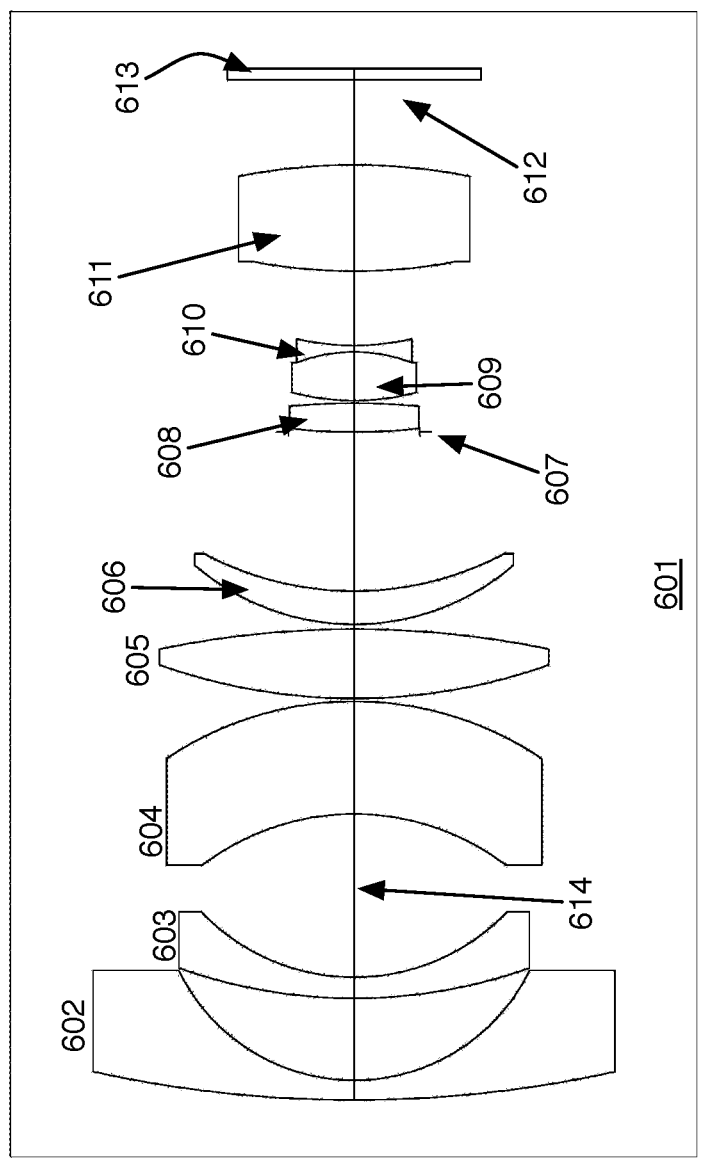
FIG. 6 is a diagram of a sixth embodiment of the high performance lens.

FIG. 6 shows the layout of Example 6. This design has a field of view of 145° with a relative aperture of F/2.

There are four groups in lens system 601 of Example 6 comprising, along the optical axis 614, from the object side to the image side (left to right):
 1) Group 1 has negative power and consists of two negative power lens elements 602, 603.
 2) Group 2 has positive power comprising 1 to 3 elements; in this example Group 2 is comprised of three lens elements 604, 605, 606.
 3) In this particular example Group 3 is comprised of a cemented doublet 609, 610 and positive lens element 608. An aperture stop 607 is adjacent to lens group 3. There is no optional meniscus element in this example. The positive element 609 of the cemented doublet is made from a material having low dispersion properties in that the index of refraction and Abbe number of the positive element 609 of the doublet are 1.59 and 68.6, respectively. The positive element 609 has a negative value for do/dT.
 4) Group 4 has positive power comprising 1 to 3 elements. In this case group 4 is comprised of one element 611.

The lens elements are all arranged symmetrically about the optical axis 614. The design a cover 612 covering an image sensor located at the focal plane 613.

The lens system satisfies equations 1-6.

The specific lens parameters for Example 6 are included in Table 6 using the same form as already described for Table 1.

TABLE 6

The optical prescription of Example 6.

| Surface | Radius | Thickness | Nd | Abbe# | Lens Element |
|---|---|---|---|---|---|
| 1 | 75.26 | 1.22 | 1.79 | 47.52 | 602 |
| 2 | 12.07 | 5.09 | | | |
| 3 | 32.45 | 1.30 | 1.70 | 55.53 | 603 |
| 4 | 13.08 | 10.13 | | | |
| 5 | −15.54 | 6.99 | 2.00 | 28.44 | 604 |

TABLE 6-continued

The optical prescription of Example 6.

| Surface | Radius | Thickness | Nd | Abbe# | Lens Element |
|---|---|---|---|---|---|
| 6 | −20.82 | 0.18 | | | |
| 7 | 36.04 | 4.30 | 1.80 | 46.57 | 605 |
| 8 | −59.20 | 0.30 | | | |
| 9 | 15.12 | 2.06 | 1.72 | 47.92 | 606 |
| 10 | 19.82 | 9.87 | | | |
| STO | Infinity | 0.00 | | | |
| 12 | 36.57 | 1.79 | 1.59 | 68.62 | 608 |
| 13 | −46.01 | 0.16 | | | |
| 14 | 14.83 | 3.02 | 1.59 | 68.62 | 609 |
| 15 | −9.80 | 0.40 | 1.85 | 23.79 | 610 |
| 16 | 15.89 | 4.62 | | | |
| 17 | 33.95 | 6.58 | 2.00 | 28.44 | 611 |
| 18 | −37.12 | 5.29 | | | |
| 19 | Infinity | 0.70 | 1.52 | 64.21 | |
| 20 | Infinity | 1.00 | | | |
| IMA | Infinity | | | | |

Example 7

Figure 7:
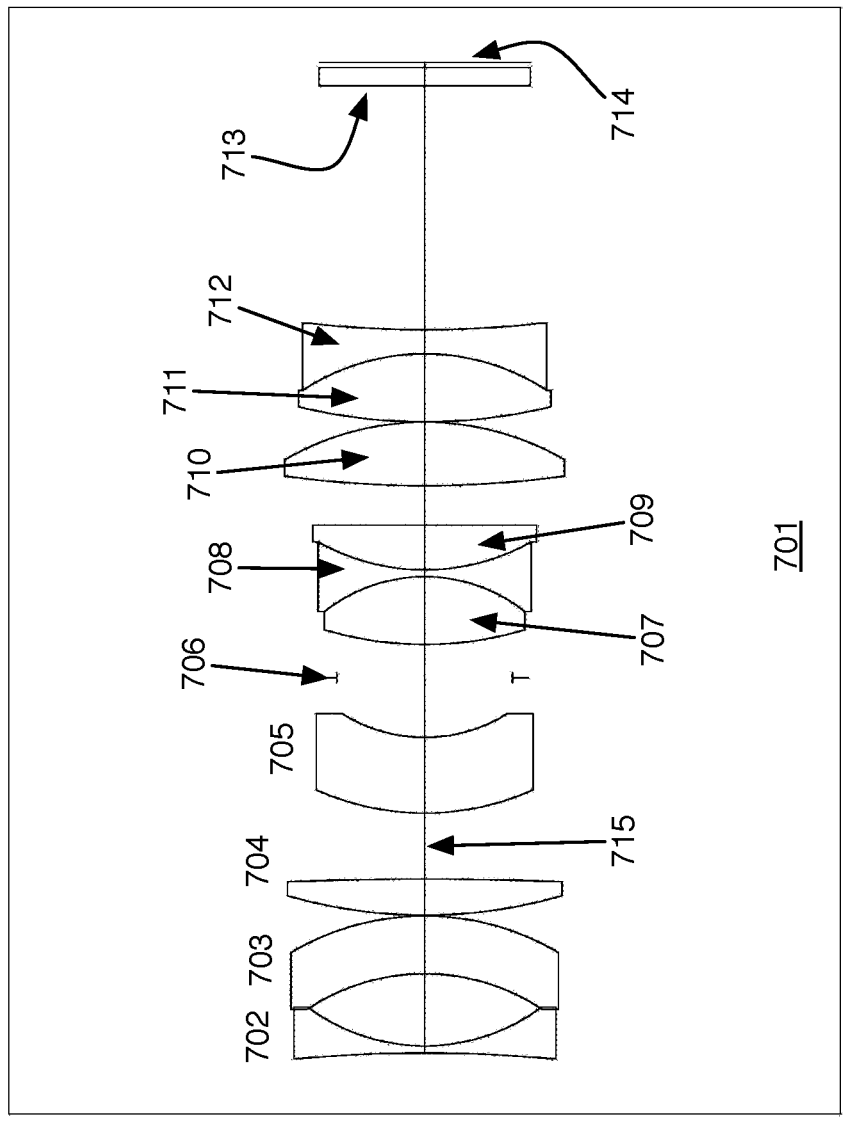
FIG. 7 is a diagram of a seventh embodiment of the high performance lens.

FIG. 7 shows the layout of Example 7. This design has a field of view of 51° with a relative aperture of F/1.8.

There are four groups in lens system 701 of Example 7 comprising, along the optical axis 715, from the object side to the image side (left to right):

1) Group 1 has negative power consisting of one negative power element 702.
2) Group 2 has positive power comprising 1 to 3 elements; in this example Group 2 is comprised of three lens elements 703, 704, 705.
3) In this particular example Group 3 is comprised of a cemented triplet 707, 708, 709. An aperture stop 706 is adjacent to lens group 3. There is no optional meniscus element in this example. The positive element 709 of the cemented triplet is made from a material having low dispersion properties in that the index of refraction and Abbe number are 1.50 and 81.6, respectively. Positive element 709 has a negative value for do/dT.
4) Group 4 has positive power comprising 1 to 3 elements. In this case group 4 is comprised of three elements 710, 711, 712.

The lens elements are all arranged symmetrically about the optical axis 715. The design includes a cover 713 covering an image sensor located at the focal plane 714.

The lens system satisfies equations 1-6.

The specific lens parameters for Example 7 are included in Table 7 using the same form as already described for Table 1.

TABLE 7

The optical prescription of Example 7.

| Surface | Radius | Thickness | Nd | Abbe# | Lens Element |
|---|---|---|---|---|---|
| 1 | −107.48 | 0.55 | 1.49 | 70.44 | 702 |
| 2 | 14.79 | 5.46 | | | |
| 3 | −15.96 | 4.38 | 1.90 | 37.37 | 703 |
| 4 | −19.80 | 0.06 | | | |
| 5 | 37.31 | 2.74 | 2.00 | 25.46 | 704 |
| 6 | −240.33 | 5.00 | | | |
| 7 | 19.99 | 5.73 | 1.95 | 17.98 | 705 |
| 8 | 11.76 | 4.52 | | | |
| STO | Infinity | 0.00 | | | |
| 10 | 26.29 | 2.53 | 1.80 | 46.50 | 707 |

TABLE 7-continued

The optical prescription of Example 7.

| Surface | Radius | Thickness | Nd | Abbe# | Lens Element |
|---|---|---|---|---|---|
| 11 | −12.19 | 5.13 | 1.85 | 23.78 | 708 |
| 12 | 16.35 | 0.53 | 1.50 | 81.56 | 709 |
| 13 | 7154.83 | 3.40 | | | |
| 14 | 77.36 | 2.98 | 1.92 | 20.88 | 710 |
| 15 | −21.09 | 4.81 | | | |
| 16 | 40.28 | 0.03 | 1.55 | 75.50 | 711 |
| 17 | −16.79 | 5.15 | 1.80 | 39.64 | 712 |
| 18 | 77.15 | 1.83 | | | |
| 19 | Infinity | 18.49 | 1.52 | 64.21 | |
| 20 | Infinity | 1.37 | | | |
| IMA | Infinity | 0.40 | | | |

Example 8

Figure 8:
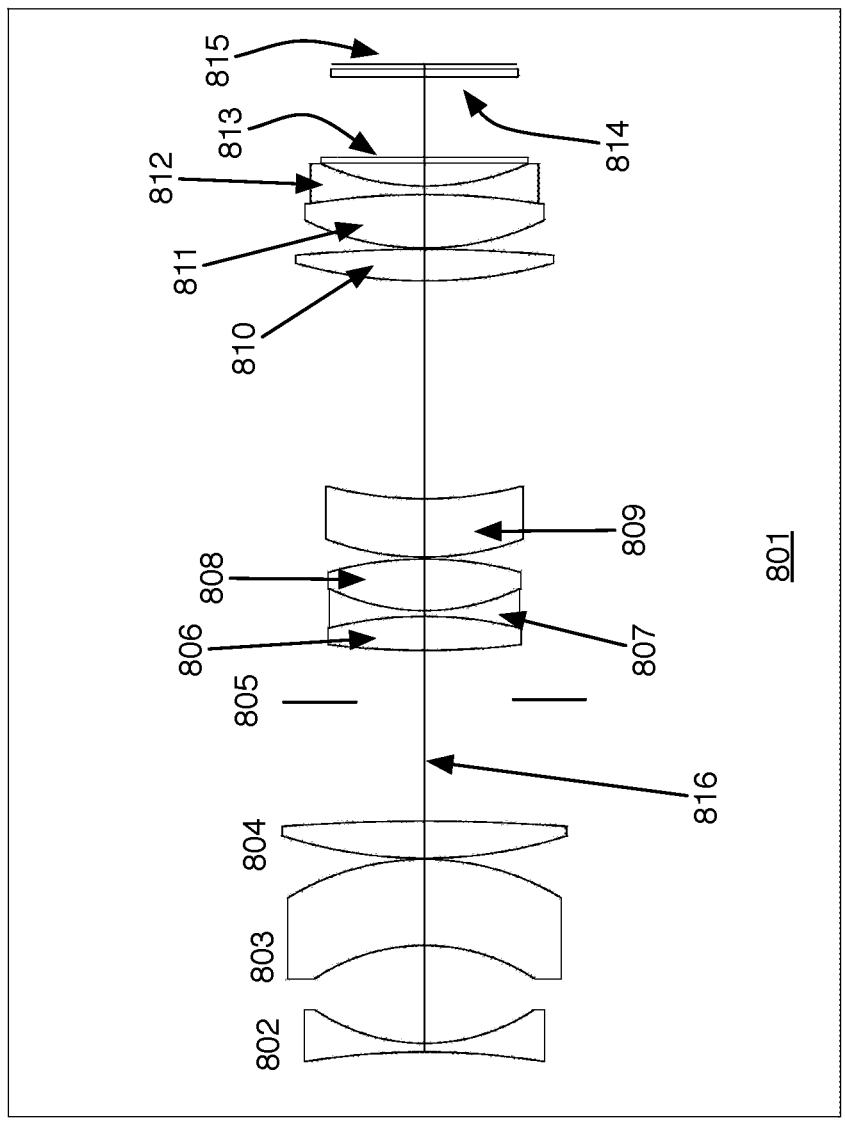
FIG. 8 is a diagram of an eighth embodiment of the high performance lens.

FIG. 8 shows the layout of Example 8. This design has a field of view of 51° with a relative aperture of F/1.8.

There are four groups in lens system 801 of Example 8 comprising, along the optical axis 816, from the object side to the image side (left to right):

1) Group 1 has negative power consisting of one negative power element 802.
2) Group 2 has positive power comprising 1 to 3 elements; in this example Group 2 is comprised of two lens elements 803, 804.
3) In this particular example Group 3 is comprised of a cemented triplet 806, 807, 808 and positive meniscus lens element 809. An aperture stop 805 is adjacent to lens group 3. The positive element 808 of the cemented triplet is made from a material having low dispersion properties in that the index of refraction and Abbe number are 1.50 and 81.6, respectively. The positive element 808 has a negative value for do/dT.
4) Group 4 has positive power comprising 1 to 3 elements. In this case group 4 is comprised of three elements 810, 811, 812.

The lens elements are all arranged symmetrically about the optical axis 816. The design includes an optional filter 813 and a cover 814 covering an image sensor located at the focal plane 815.

The lens system satisfies equations 1-6.

The specific lens parameters for Example 8 are included in Table 8 using the same form as already described for Table 1.

TABLE 8

The optical prescription of Example 8.

| Surface | Radius | Thickness | Nd | Abbe# | Lens Element |
|---|---|---|---|---|---|
| 1 | −64.53 | 0.75 | 1.57 | 56.06 | 802 |
| 2 | 16.82 | 8.43 | | | |
| 3 | −17.03 | 7.42 | 1.88 | 40.81 | 803 |
| 4 | −22.50 | 0.10 | | | |
| 5 | 39.73 | 3.19 | 2.00 | 25.44 | 804 |
| 6 | −169.81 | 14.72 | | | |
| STO | Infinity | 0.00 | | | |
| 7 | 70.55 | 2.93 | 1.57 | 56.06 | 806 |
| 8 | −33.60 | 0.49 | 1.85 | 23.79 | 807 |
| 9 | 18.60 | 4.45 | 1.50 | 81.59 | 808 |
| 10 | −30.36 | 0.15 | | | |
| 11 | 23.80 | 5.03 | 1.74 | 49.24 | 809 |
| 12 | 33.02 | 18.76 | | | |
| 13 | 41.10 | 2.73 | 2.00 | 25.44 | 810 |

TABLE 8-continued

The optical prescription of Example 8.

| Surface | Radius | Thickness | Nd | Abbe# | Lens Element |
|---|---|---|---|---|---|
| 14 | −118.59 | 0.10 | | | |
| 15 | 23.28 | 4.62 | 1.50 | 81.59 | 811 |
| 16 | −62.49 | 0.72 | 1.73 | 54.67 | 812 |
| 17 | 21.53 | 2.00 | | | |
| 18 | Infinity | 0.50 | 1.52 | 64.20 | |
| 19 | Infinity | 6.91 | | | |
| 20 | Infinity | 0.70 | 1.52 | 64.20 | |
| 21 | Infinity | 0.40 | | | |
| IMA | Infinity | | | | |

Example 9

Figure 9:
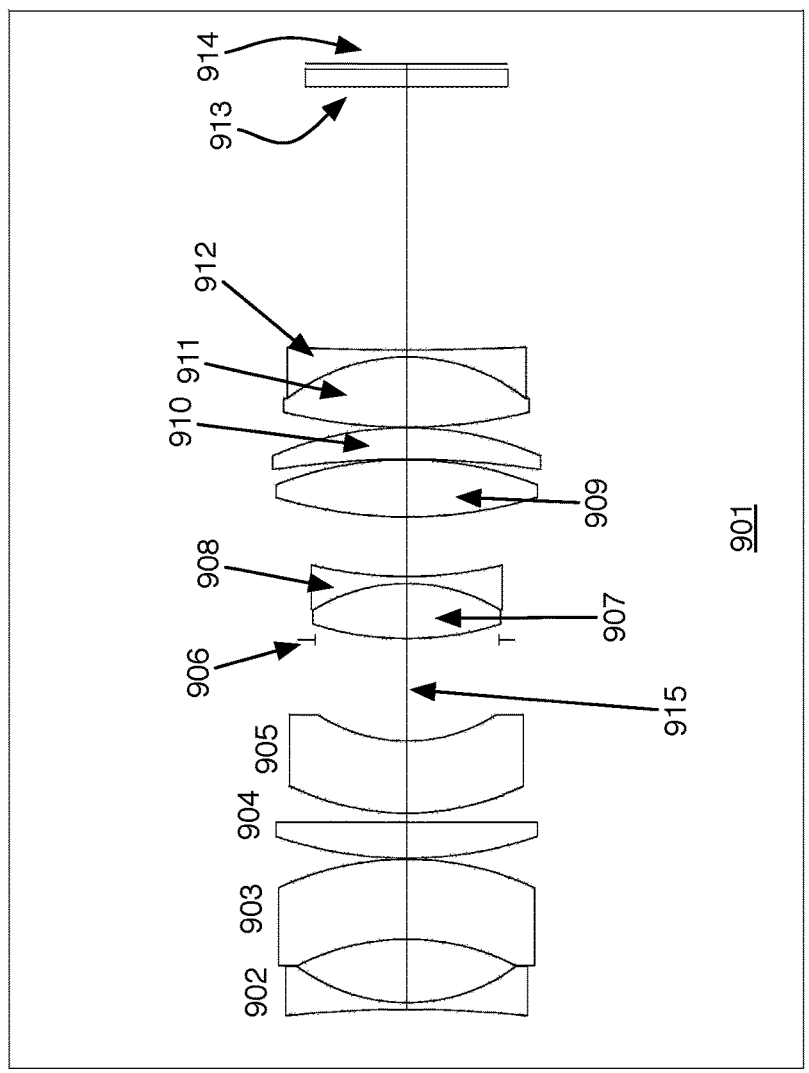
FIG. 9 is a diagram of a ninth embodiment of the high performance lens.

FIG. 9 shows the layout of Example 9. This design has a field of view of 51° with a relative aperture of F/1.8.

There are four groups in lens system 901 of Example 9 comprising, along the optical axis 915, from the object side to the image side (left to right):
1) Group 1 has negative power consisting of one negative power element 902.
2) Group 2 has positive power comprising 1 to 3 elements; in this example Group 2 is comprised of three lens elements 903, 904, 905.
3) In this particular example Group 3 is comprised of a cemented doublet 907, 908 and positive lens element 909. An aperture stop 906 is adjacent to lens group 3. There is no optional meniscus element in this example. The positive element 907 of the doublet is made from a material having low dispersion properties in that the index of refraction and Abbe number are 1.70 and 55.5, respectively. The value for do/dT of element 907 is positive.
4) Group 4 has positive power comprising 1 to 3 elements. In this case group 4 is comprised of three elements 910, 911, 912.

The lens elements are all arranged symmetrically about the optical axis 915. The design includes an optional cover 913 covering an image sensor located at the focal plane 914.

The lens system satisfies equations 1-6.

The specific lens parameters for Example 9 are included in Table 9 using the same form as already described for Table 1.

TABLE 9

The optical prescription of Example 9.

| Surface | Radius | Thickness | Nd | Abbe# | Lens Element |
|---|---|---|---|---|---|
| 1 | −92.68 | 0.54 | 1.49 | 70.44 | 902 |
| 2 | 14.47 | 5.04 | | | |
| 3 | −18.82 | 6.33 | 1.88 | 40.81 | 903 |
| 4 | −23.76 | 0.08 | | | |
| 5 | 31.87 | 2.82 | 2.00 | 25.46 | 904 |
| 6 | 2421.59 | 0.79 | | | |
| 7 | 20.99 | 5.70 | 1.95 | 17.98 | 905 |
| 8 | 12.97 | 8.03 | | | |
| STO | Infinity | 0.09 | | | |
| 10 | 24.26 | 4.37 | 1.70 | 55.46 | 907 |
| 11 | −14.00 | 0.55 | 1.85 | 23.78 | 908 |
| 12 | 31.37 | 4.78 | | | |
| 13 | 35.34 | 4.53 | 1.50 | 81.56 | 909 |
| 14 | −27.65 | 0.02 | | | |
| 15 | −68.42 | 2.49 | 2.10 | 17.02 | 910 |
| 16 | −26.46 | 0.06 | | | |

TABLE 9-continued

The optical prescription of Example 9.

| Surface | Radius | Thickness | Nd | Abbe# | Lens Element |
|---|---|---|---|---|---|
| 17 | 40.74 | 5.54 | 1.55 | 75.50 | 911 |
| 18 | −15.17 | 0.57 | 1.81 | 40.73 | 912 |
| 19 | 195.65 | 20.93 | | | |
| 20 | Infinity | 1.37 | 1.52 | 64.21 | |
| 21 | Infinity | 0.46 | | | |
| IMA | Infinity | | | | |

Example 10

Figure 10:
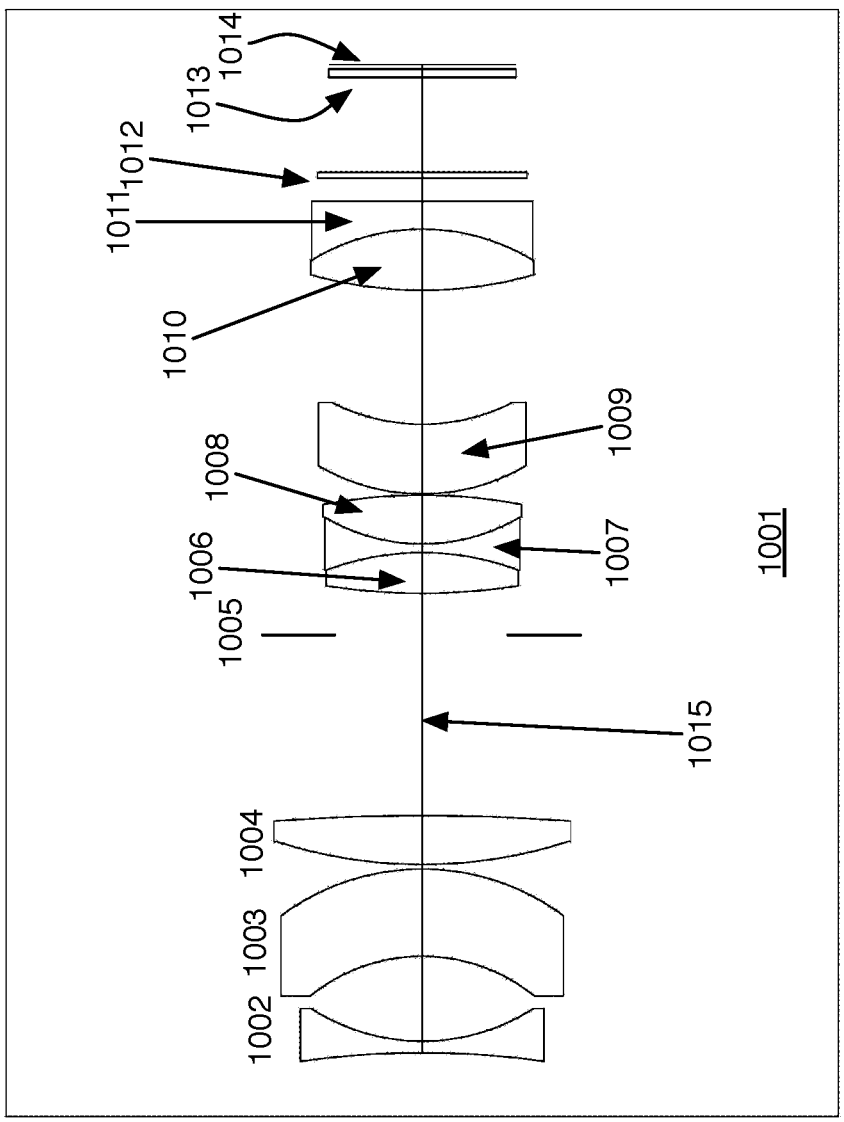
FIG. 10 is a diagram of a tenth embodiment of the high performance lens.

FIG. 10 shows the layout of Example 10. This design has a field of view of 51° with a relative aperture of F/1.8.

There are four groups in lens system 1001 of Example 10 comprising, along the optical axis 1015, from the object side to the image side (left to right):
1) Group 1 has negative power consisting of one negative power element 1002.
2) Group 2 has positive power comprising 1 to 3 elements; in this example Group 2 is comprised of two lens elements 1003, 1004.
3) In this particular example Group 3 is comprised of a cemented triplet 1006, 1007, 1008 and positive meniscus lens element 1009. An aperture stop 1005 is adjacent to lens group 3. The positive lens elements 1006, 1008 of the triplet are made from material having a high refractive index (1.68, 1.63) and high Abbe number 55.6 and 63.5 respectively. Positive element 1008 has a negative value for do/dT.
4) Group 4 has positive power comprising 1 to 3 elements. In this case group 4 is comprised of two elements 1010, 1011.

The lens elements are all arranged symmetrically about the optical axis 1015. The design includes an optional filter 1012 and a cover 1013 covering an image sensor located at the focal plane 1014.

The lens system satisfies equations 1-6.

The specific lens parameters for Example 10 are included in Table 10 using the same form as already described for Table 1.

TABLE 10

The optical prescription of Example 10.

| Surface | Radius | Thickness | Nd | Abbe# | Lens Element |
|---|---|---|---|---|---|
| 1 | −74.74 | 1.00 | 1.64 | 60.21 | 1002 |
| 2 | 17.58 | 7.31 | | | |
| 3 | −15.23 | 7.50 | 1.76 | 52.33 | 1003 |
| 4 | −20.29 | 0.39 | | | |
| 5 | 40.45 | 4.20 | 2.00 | 25.44 | 1004 |
| 6 | −170.45 | 19.13 | | | |
| STO | Infinity | 0.00 | | | |
| 7 | 52.39 | 3.50 | 1.68 | 55.56 | 1006 |
| 8 | −23.20 | 0.75 | 1.85 | 23.79 | 1007 |
| 9 | 16.38 | 4.20 | 1.62 | 63.41 | 1008 |
| 10 | −44.93 | 0.10 | | | |
| 11 | 17.56 | 6.00 | 1.80 | 46.57 | 1009 |
| 12 | 17.05 | 11.53 | | | |
| 13 | 35.36 | 5.25 | 1.92 | 20.88 | 1010 |
| 14 | −18.20 | 2.40 | 1.95 | 32.32 | 1011 |
| 15 | Infinity | 2.00 | | | |
| 16 | Infinity | 0.50 | 1.52 | 64.20 | |
| 17 | Infinity | 8.17 | | | |
| 18 | Infinity | 0.70 | 1.52 | 64.20 | |

TABLE 10-continued

The optical prescription of Example 10.

| Surface | Radius | Thickness | Nd | Abbe# | Lens Element |
|---|---|---|---|---|---|
| 19 | Infinity | 0.40 | | | |
| IMA | Infinity | | | | |

Example 11

Figure 11:
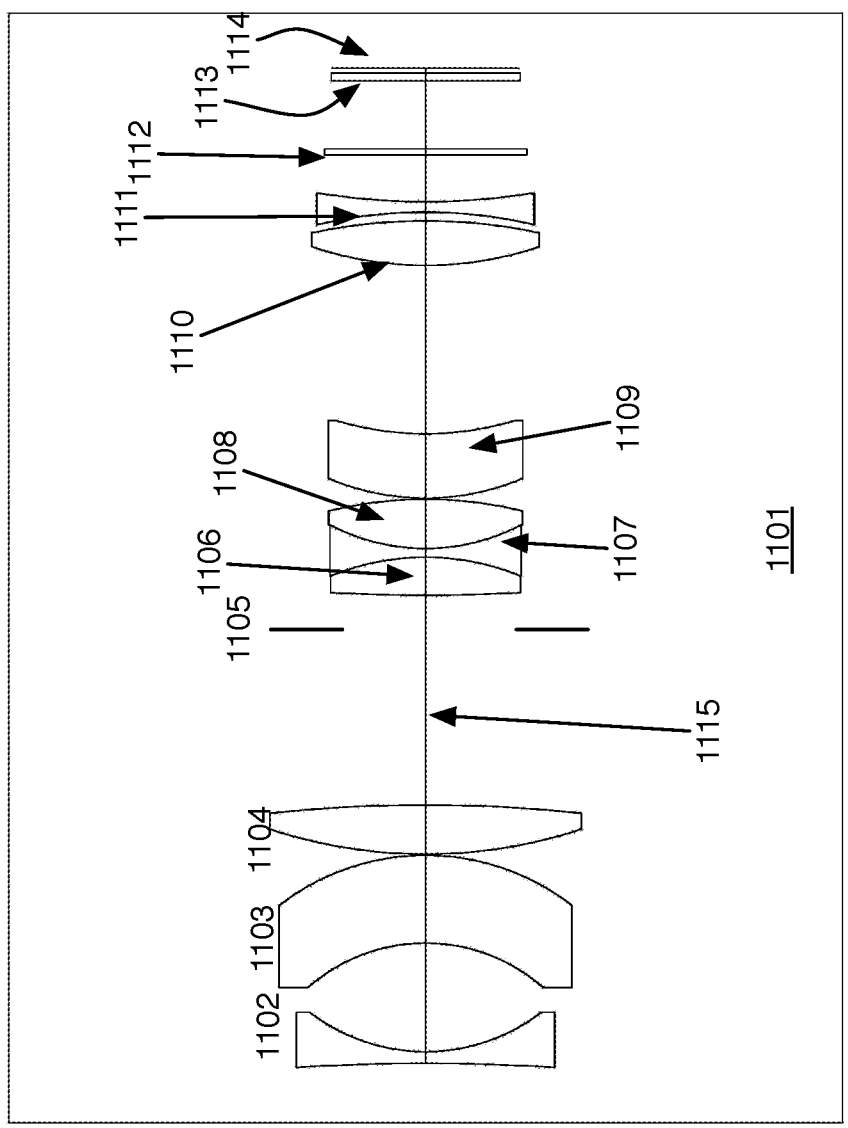
FIG. 11 is a diagram of an eleventh embodiment of the high performance lens.

FIG. 11 shows the layout of Example 11. This design has a field of view of 51° with a relative aperture of F/1.8.

There are four groups in lens system 1101 of Example 11 comprising, along the optical axis 1115, from the object side to the image side (left to right):

1) Group 1 has negative power consisting of one negative power element 1102.
2) Group 2 has positive power comprising 1 to 3 elements; in this example Group 2 is comprised of two lens elements 1103,1104.
3) In this particular example Group 3 is comprised of a cemented triplet 1106, 1107, 1108 and positive meniscus lens element 1109. An aperture stop 1105 is adjacent to lens group 3. The positive elements 1106, 1108 of the cemented triplet are also made of materials having a high refractive index and Abbe number. The positive element 1108 has a negative value for do/dT.
4) Group 4 has positive power comprising 1 to 3 elements. In this case group 4 is comprised of two elements 1110, 1111.

The lens elements are all arranged symmetrically about the optical axis 1115. The design includes an optional filter 1112 and a cover 1113 covering an image sensor located at the focal plane 1114.

The lens system satisfies equations 1-6.

The specific lens parameters for Example 11 are included in Table 11 using the same form as already described for Table 1.

TABLE 11

The optical prescription of Example 11.

| Surface | Radius | Thickness | Nd | Abbe# | Lens Element |
|---|---|---|---|---|---|
| 1 | −172.63 | 1.00 | 1.62 | 58.15 | 1102 |
| 2 | 16.17 | 9.28 | | | |
| 3 | −15.12 | 7.50 | 1.62 | 58.15 | 1103 |
| 4 | −20.32 | 0.10 | | | |
| 5 | 42.41 | 4.20 | 2.00 | 25.44 | 1104 |
| 6 | −124.22 | 17.92 | | | |
| STO | Infinity | | | | |
| 7 | 139.50 | 3.25 | 1.68 | 55.56 | 1106 |
| 8 | −21.22 | 0.75 | 1.85 | 23.79 | 1107 |
| 9 | 17.48 | 4.20 | 1.62 | 63.41 | 1108 |
| 10 | −34.73 | 0.10 | | | |
| 11 | 21.18 | 5.50 | 1.73 | 54.67 | 1109 |
| 12 | 26.16 | 14.39 | | | |
| 13 | 30.36 | 3.80 | 1.92 | 20.88 | 1110 |
| 14 | −46.30 | 0.74 | | | |
| 15 | −40.56 | 0.90 | 1.76 | 52.33 | 1111 |
| 16 | 56.99 | 4.00 | | | |
| 17 | Infinity | 0.50 | 1.52 | 64.20 | |
| 18 | Infinity | 5.80 | | | |
| 19 | Infinity | 0.70 | 1.52 | 64.20 | |
| 20 | Infinity | 0.40 | | | |
| IMA | Infinity | | | | |

Example 12

Figure 12:
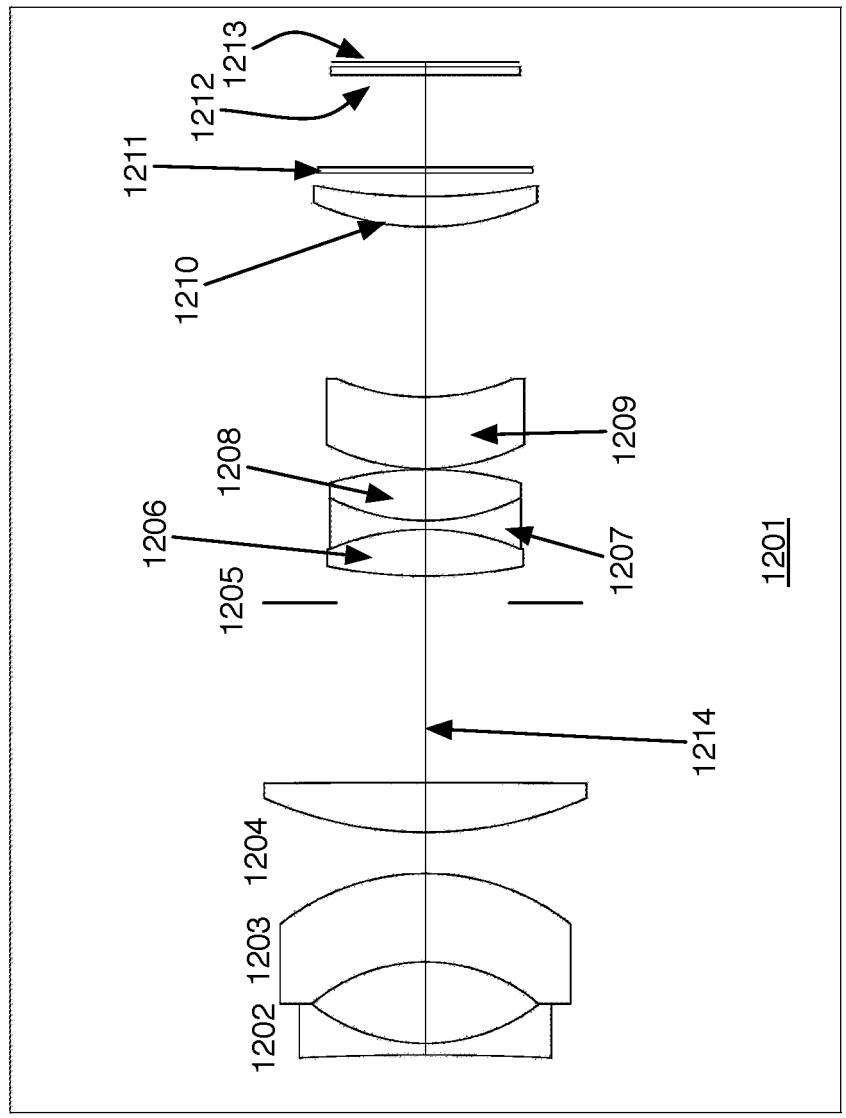
FIG. 12 is a diagram of a twelfth embodiment of the high performance lens.

FIG. 12 shows the layout of Example 12. This design has a field of view of 51° with a relative aperture of F/1.8.

There are four groups in lens system 1201 of Example 12 comprising, along the optical axis 1214, from the object side to the image side (left to right):

1) Group 1 has negative power consisting of one negative power element 1202.
2) Group 2 has positive power comprising 1 to 3 elements; in this example Group 2 is comprised of two lens elements 1203, 1204.
3) In this particular example Group 3 is comprised of a cemented triplet 1206, 1207, 1208 and positive meniscus lens element 1209. An aperture stop 1205 is adjacent to lens group 3. The positive elements 1206, 1208 of the cemented triplet are also made of materials having a high refractive index and high Abbe number. Positive element 1206 has a negative value for do/dT.
4) Group 4 has positive power comprising 1 to 3 elements. In this case group 4 is comprised of two elements 1210, 1211.

The lens elements are all arranged symmetrically about the optical axis 1214. The design includes an optional filter 1211 and a cover 1212 covering an image sensor located at the focal plane 1213.

The lens system satisfies equations 1-6.

The specific lens parameters for Example 12 are included in Table 12 using the same form as already described for Table 1.

TABLE 12

The optical prescription of Example 12.

| Surface | Radius | Thickness | Nd | Abbe# | Lens Element |
|---|---|---|---|---|---|
| 1 | −246.40 | 1.00 | 1.65 | 33.84 | 1202 |
| 2 | 15.67 | 6.94 | | | |
| 3 | −14.84 | 7.55 | 1.80 | 46.57 | 1203 |
| 4 | −19.86 | 3.52 | | | |
| 5 | 33.80 | 4.24 | 2.00 | 25.44 | 1204 |
| 6 | −1196.09 | 17.63 | | | |
| STO | Infinity | | | | |
| 7 | 42.80 | 3.97 | 1.59 | 68.62 | 1206 |
| 8 | −20.41 | 0.75 | 1.85 | 23.79 | 1207 |
| 9 | 17.91 | 4.37 | 1.52 | 64.21 | 1208 |
| 10 | −29.05 | 0.07 | | | |
| 11 | 18.31 | 6.11 | 1.92 | 20.88 | 1209 |
| 12 | 19.04 | 14.52 | | | |
| 13 | 22.95 | 2.59 | 1.95 | 17.94 | 1210 |
| 14 | 48.28 | 2.00 | | | |
| 15 | Infinity | 0.50 | 1.52 | 64.20 | |
| 16 | Infinity | 7.87 | | | |
| 17 | Infinity | 0.70 | 1.52 | 64.20 | |
| 18 | Infinity | 0.40 | | | |
| IMA | Infinity | | | | |

Examples Summary

The effective focal length F of the entire lens assembly, F1 of group 1, F2 of group 2, F3 of group 3 and F4 of group 4 are shown in Tables 13A and 13B. The examples in Table 13A all have an effective focal length of 10.2 or less and a field of view between 97° and 145°. The examples summarized in Table 13B all have an effective focal length of about 18.5 and a field of view of about 50°. All of the examples summarized in both tables 13A and 13B are described per the four lens groups and the details of each as discussed repeatedly above as well as the six parametric equations (1)-(6), repeated here for convenience.

TABLE 13A

Summary of Lens parameters for Examples 1-6

| Example | 1 | 2 | 3 | 4 | 5 | 6 |
|---|---|---|---|---|---|---|
| F of entire lens assembly | 10.2 | 9.8 | 10.0 | 9.8 | 6.83 | 6.83 |
| F1 of group 1 | −11.3 | −11.8 | −9.5 | −10.2 | −10.1 | −10.4 |
| F2 of group 2 | 24.2 | 21.7 | 18.6 | 19.7 | 18.8 | 18.1 |
| F3 of group 3 | 52.8 | 333.3 | −232.1 | 128.2 | 108.1 | 1411 |
| F4 of group 4 | 30.1 | 30.4 | 20.6 | 30.0 | 20.0 | 18.4 |
| F1/F | −1.1 | −1.2 | −0.9 | −1.0 | −1.48 | −1.52 |
| F2/F | 2.4 | 2.2 | 1.9 | 2.0 | 2.75 | 2.65 |
| |F3/F| | 5.2 | 33.8 | 23.1 | 13.1 | 15.83 | 206.6 |
| F4/F | 3.0 | 3.1 | 2.0 | 3.1 | 2.9 | 2.7 |
| F4/F1 | −2.7 | −2.6 | −2.2 | −2.9 | −2.0 | −1.8 |
| F4/F2 | 1.2 | 1.4 | 1.1 | 1.5 | 1.1 | 1.8 |

TABLE 13B

Summary of Lens parameters for Examples 7-12

| Example | 7 | 8 | 9 | 10 | 11 | 12 |
|---|---|---|---|---|---|---|
| F | 18.5 | 18.6 | 18.5 | 18.6 | 18.6 | 18.6 |
| F1 | −26.6 | −23.4 | −25.6 | −22.2 | −23.7 | −22.7 |
| F2 | 61.7 | 30.7 | 52.5 | 30.9 | 30.7 | 30.1 |
| F3 | 124.9 | 105.0 | 41.7 | 79.1 | 79.8 | 82.2 |
| F4 | 20.3 | 42.2 | 45.8 | 40.8 | 48.6 | 44.1 |
| F1/F | −1.4 | −1.3 | −1.4 | −1.2 | −1.3 | −1.2 |
| F2/F | 3.3 | 1.6 | 2.8 | 1.7 | 1.7 | 1.6 |
| |F3/F| | 6.7 | 5.6 | 2.3 | 4.3 | 4.3 | 4.4 |
| F4/F | 1.1 | 2.3 | 2.5 | 2.2 | 2.6 | 2.4 |
| F4/F1 | −0.8 | −1.8 | −1.8 | −1.8 | −2.1 | −1.9 |
| F4/F2 | 0.3 | 1.4 | 0.9 | 1.3 | 1.6 | 1.5 |

The following conditions are satisfied:

$$-2 =< F1/F =< -0.8 \quad (1)$$

$$1.5 =< F2/F =< 3.5 \quad (2)$$

$$2. =< |F3/F| \quad (3)$$

$$1. =< F4/F =< 3.5 \quad (4)$$

$$-3 =< F4/F1 =< -0.6 \quad (5)$$

$$0.2 =< F4/F2 =< 2. \quad (6)$$

In preferred embodiments the following equation is satisfied by Group 1:

$$-1.6 =< F1/F =< -0.8 \quad (7)$$

SUMMARY

High performance lens system designs are described. The lens system has four lens groups, is made entirely of spherical lens elements, and, includes selected lens elements made of materials with high refractive index and Abbe numbers and coefficient of thermal expansion that provide stable high performance across wide and rapid temperature changes. Group descriptions and parametric equations enable creation of designs having fields of view ranging from 50 to 150 degrees.

We claim:

1. An optical lens for imaging, said lens having an effective focal length, a field of view, and optical axis and an image plane, and, said optical lens comprising:
   a. four lens groups located along the optical axis in order from object to image group 1, group 2, group 3, and, group 4, each group having an effective focal length, and,
   b. group 1 has negative power consisting of one or two lens elements, all lens elements in group 1 have negative power, and, $-1.6 =< F1/F =< -0.8$, where F is the effective focal length of the optical lens, F1 is the effective focal length of group 1, and,
   c. group 2 has positive power comprising 1 to 3 elements, and,
   d. group 3 comprises a meniscus lens, and, a cemented doublet or a cemented triplet, the cemented doublet or cemented triplet having at least one positive element, and, where at least one of the at least one positive element is made of material having an Abbe number greater than 63, and,
   e. group 4 has positive power comprising 1 to 3 elements.

2. The optical lens of claim 1 that satisfies the parametric equations:

$$1.5 =< F2/F =< 3.5 \quad \text{a.}$$

$$2. =< |F3/F| \quad \text{b.}$$

$$1. =< F4/F =< 3.5 \quad \text{c.}$$

$$-3 =< F4/F1 =< -0.6 \quad \text{d.}$$

$$0.3 =< F4/F2 =< 2.5 \quad \text{e.}$$

where F is the effective focal length of the optical lens, F1 is the effective focal length of group 1, F2 is the effective focal length of group 2, F3 is the effective focal length of group 3, and, F4 is the effective focal length of group 4.

3. An optical lens for imaging, said lens having an effective focal length, a field of view, and optical axis and an image plane, and, said optical lens comprising:
   a. four lens groups located along the optical axis in order from object to image group 1, group 2, group 3, and, group 4, each group having an effective focal length, and,
   b. group 1 has negative power consisting of one or two lens elements, and, lens elements in group 1 have negative power, and,
   c. group 2 has positive power comprising 1 to 3 elements, and,
   d. group 3 comprises a meniscus lens, and, a cemented doublet or a cemented triplet, the cemented doublet or cemented triplet having at least one positive element, and, where at least one of the at least one positive element is made of material having a negative dn/dT, where n is the index of refraction of the material at d-line, and T is a temperature of an environment containing the optical lens, and,
   e. group 4 has positive power comprising 1 to 3 elements.

4. The optical lens of claim 3 where group 3 comprises a cemented doublet or a cemented triplet, the cemented doublet or cemented triplet having at least one positive element, and, where at least one of the at least one positive element is made of material having an Abbe number greater than 63.

5. The optical lens of claim 3 that satisfies the parametric equations:

$$-1.6 =< F1/F =< -0.8 \quad \text{a.}$$

where F is the effective focal length of the optical lens, F1 is the effective focal length of group 1.

6. The optical lens of claim 3 that satisfies the parametric equations:

$-2=<F1/F=<-0.8$      a.

$1.5=<F2/F=<3.5$      b.

$2.=<|F3/F1|$      c.

$1.=<F4/F=<3.5$      d.

$-3=<F4/F1=<-0.6$      e.

$0.3=<F4/F2=<2.5$      f.

where F is the effective focal length of the optical lens, F1 is the effective focal length of group 1, F2 is the effective focal length of group 2, F3 is the effective focal length of group 3, and, F4 is the effective focal length of group 4.

7. An optical lens for imaging, said optical lens having an effective focal length, and, an optical axis, and, said optical lens consisting of:
   a. four lens groups located along the optical axis in order from object to image group 1, group 2, group 3, and, group 4, each lens group having an effective focal length, and,
   b. group 1 has negative power consisting of one or two lens elements, and, all lens elements in group 1 have negative power, and,
   c. group 2 has positive power consisting of 1 to 3 elements, and,
   d. group 3 consists of a cemented doublet or a cemented triplet, the cemented doublet or cemented triplet having at least one positive element, and, having an Abbe number greater than 63 and a negative do/dT, where n is the index of refraction of the material at d-line, and T is a temperature of an environment containing the optical lens, and,
   e. group 4 has positive power consisting of 1 to 3 elements, and,
   f. the optical lens satisfies the parametric equations:

$-2=<F1/F=<-0.8$      i.

$1.5=<F2/F=<3.5$      ii.

$2.=<|F3/F|$      iii.

$1.=<F4/F=<3.5$      iv.

$-3=<F4/F1=<-0.6$      v.

$0.3=<F4/F2=<2.5$      vi.

where F is the effective focal length of the optical lens, F1 is the effective focal length of group 1, F2 is the effective focal length of group 2, F3 is the effective focal length of group 3, and, F4 is the effective focal length of group 4.

8. The optical lens of claim 7 that satisfies the parametric equations:

$-1.6=<F1/F=<-0.8$      a.

where F is the effective focal length of the optical lens, F1 is the effective focal length of group 1.

\* \* \* \* \*